(12) United States Patent
Wu

(10) Patent No.: US 12,034,672 B2
(45) Date of Patent: Jul. 9, 2024

(54) METHOD FOR DETERMINING CONTENTION WINDOW SIZE (CWS), AND RELATED PRODUCT

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 400 days.

(21) Appl. No.: 17/487,950

(22) Filed: Sep. 28, 2021

(65) Prior Publication Data

US 2022/0021506 A1 Jan. 20, 2022

Related U.S. Application Data

(63) Continuation of application No. PCT/CN2019/080684, filed on Mar. 29, 2019.

(51) Int. Cl.
*H04L 5/00* (2006.01)
*H04L 1/16* (2023.01)
(Continued)

(52) U.S. Cl.
CPC .......... *H04L 5/0055* (2013.01); *H04L 1/1678* (2013.01); *H04L 5/0048* (2013.01); *H04W 72/044* (2013.01); *H04W 74/0866* (2013.01)

(58) Field of Classification Search
CPC ............. H04W 72/0446; H04W 88/08; H04W 72/0453; H04W 24/00; H04W 72/044;
(Continued)

(56) References Cited

U.S. PATENT DOCUMENTS 9,942,898 B2 * 4/2018 Dinan .................... H04L 5/001
11,632,786 B2 * 4/2023 Xue ....................... H04L 5/0092
370/330
(Continued)

FOREIGN PATENT DOCUMENTS

CN 105103637 A 11/2015
CN 107135461 A 9/2017
(Continued)

OTHER PUBLICATIONS

3GPP TSG RAN WG1 #97, Reno, USA, May 13-17, 2019, R1-1906224, Source: NTT DOCOMO, Inc., Title: Enhancements on multi-TRP / panel transmission, Agenda item: 7.2.8.2. (Year: 2019).*

(Continued)

*Primary Examiner* — Peter G Solinsky
*Assistant Examiner* — Sanjay K Dewan
(74) *Attorney, Agent, or Firm* — BAYES PLLC

(57) ABSTRACT

A method for determining a contention window size (CWS) is applied to a network device and includes determining hybrid automatic repeat request-acknowledgement (HARQ-ACK) information corresponding to a physical downlink shared channel (PDSCH) transmitted on a reference time unit on a first unlicensed carrier; and determining a first CWS according to the HARQ-ACK information, wherein the first CWS is used for performing channel detection on the first unlicensed carrier.

9 Claims, 3 Drawing Sheets

(51) Int. Cl.
*H04L 1/1607* (2023.01)
*H04W 72/04* (2023.01)
*H04W 72/044* (2023.01)
*H04W 74/08* (2024.01)

(58) Field of Classification Search
CPC ............ H04W 74/0866; H04L 5/0007; H04L 5/0055; H04L 1/1678; H04L 5/0048
USPC .......................................................... 370/330
See application file for complete search history.

(56) References Cited

U.S. PATENT DOCUMENTS

| | | | |
|---|---|---|---|
| 2014/0003387 A1* | 1/2014 | Lee | H04W 72/0446 370/330 |
| 2016/0143014 A1* | 5/2016 | Mukherjee | H04L 5/0007 370/330 |
| 2017/0079013 A1* | 3/2017 | Noh | H04W 72/23 |
| 2018/0115981 A1* | 4/2018 | Kim | H04W 72/1215 |
| 2018/0124828 A1 | 5/2018 | Kim et al. | |
| 2018/0139779 A1 | 5/2018 | Kim et al. | |
| 2018/0175975 A1 | 6/2018 | Um et al. | |
| 2018/0242360 A1 | 8/2018 | Noh et al. | |
| 2019/0149305 A1* | 5/2019 | Zhou | H04L 5/0048 370/330 |
| 2019/0387546 A1* | 12/2019 | Li | H04L 27/26132 |
| 2020/0092913 A1* | 3/2020 | Xu | H04W 72/0446 |
| 2023/0156714 A1* | 5/2023 | Marinier | H04L 5/0094 370/330 |

FOREIGN PATENT DOCUMENTS

| | | |
|---|---|---|
| CN | 107580801 A | 1/2018 |
| CN | 108141311 A | 6/2018 |
| CN | 109479321 A | 3/2019 |
| EP | 3297192 A1 | 3/2018 |
| JP | 2018520614 A | 7/2018 |
| WO | WO 2020/167851 A1 * | 8/2020 ............... H04L 1/18 |

OTHER PUBLICATIONS

3GPP TSG RAN WG1 #96, Athens, Greece, Feb. 25-Mar. 1, 2019, R1-1901922, Source: OPPO, Title: Channel access procedure for NR-U, Agenda Item: 7.2.2.2.1. (Year: 2019).*

3GPP TSG-RAN WG1 Meeting #96, Athens, Greece, Feb. 25-Mar. 1, 2019, R1-1902257, Agenda item: 7.2.2.1, Source: Samsung, Title: Channel access procedures for NR-U. (Year: 2019).*

3GPP TSG RAN WG1 Meeting #96, Athens, Greece, Feb. 25-Mar. 1, 2019, R1-1902471, Agenda Item: 7.2.2.2.1, Source: Intel Corporation, Title: Channel access mechanism for NR-unlicensed. (Year: 2019).*

International Search Report issued in corresponding International Application No. PCT/CN2019/080684, mailed Dec. 30, 2019, 28 pages.

PCT Written Opinion of the International Searching Authority issued in corresponding International Application No. PCT/CN2019/080684, mailed Dec. 30, 2019, 6 pages.

"Channel access procedures for NR-U", Agenda item: 7.2.2.4.1, Source: Samsung, 3GPP TSG-RAN WG1 Meeting #95, R1-1812977, Spokane, USA, Nov. 12-16, 2018, 9 pages.

Request for CNIPA Patent Priority Review issued in corresponding Chinese Application No. 202111016449.3, mailed Aug. 26, 2022.

First Office Action issued in corresponding Chinese Application No. 202111016449.3, mailed Nov. 16, 2022.

First Office Action issued in corresponding European Application No. 19922742.2, mailed Jan. 3, 2023.

First Office Action issued in corresponding Japanese Application No. 2021-557986, mailed Jan. 17, 2023.

OPPO, "Channel access procedures for NR-U", R1-1901922, 3GPP TSG RAN WG1 #96 Athens, Greece, Feb. 25-Mar. 1, 2019.

Extended European Search Report issued in corresponding European Application No. 19922742.2, mailed Mar. 15, 2022, 7 pages.

Second Office Action issued in corresponding European Application No. 19922742.2, mailed Jun. 21, 2023.

Second Office Action issued in corresponding Japanese Application No. 2021-557986, mailed Aug. 4, 2023.

Intel Corporation, "Channel access mechanism for NR-unlicensed", R1-1902471, 3GPP TSG RAN WG1 Meeting #96 Athens, Greece, Feb. 25-Mar. 1, 2019.

Samsung, "Channel access procedures for NR-U", R1-1902257, 3GPP TSG-RAN WG1 Meeting #96 Athens, Greece, Feb. 25-Mar. 1, 2019.

Third Office Action issued in corresponding European Application No. 19922742.2, mailed Nov. 6, 2023.

Notice of Allowance issued in corresponding Japanese Application No. 2021-557986, mailed Nov. 14, 2023.

* cited by examiner

A network device determines first information that is on a first unlicensed carrier and corresponds to a reference time unit — S201

The network device determines according to the first information, a first CWS, wherein the firsts CWS is used for carrying out channel detection on the first unlicensed carrier — S202

METHOD FOR DETERMINING CONTENTION WINDOW SIZE (CWS), AND RELATED PRODUCT

CROSS-REFERENCE TO RELATED APPLICATION

This application is a continuation application of PCT Application No. PCT/CN2019/080684, filed Mar. 29, 2019, the entire contents of which are incorporated herein by reference.

BACKGROUND

The disclosure relates to the field of communication technology and, in particular, to a method for determining a contention window size (CWS) and related products.

Generally, the method for determining CWS is based on the long term evaluation-licensed-assisted access (LTE-LAA) system. There are many technical differences between 5G New Radio-Unlicensed (NR-U) system and the LTE-LAA system. For example, the NR-U system supports feedback of uplink hybrid automatic repeat-request acknowledgement (HARQ-ACK) information on the unlicensed carrier, which is not supported by LTE-LAA. Therefore, when the carrier transmitting the uplink HARQ-ACK information is an unlicensed carrier, how to determine CWS is a problem that needs to be solved.

SUMMARY

Embodiment of the disclosure provide a method for determining CWS and related products, in order to improve the accuracy of CWS, and thereby realizing friendly coexistence of multiple systems on unlicensed spectrum.

According to a first aspect of embodiments of the disclosure, there is provided a method for determining CWS, which is applied to a network device and includes determining first information corresponding to a reference time unit on a first unlicensed carrier; determining a first CWS according to the first information, wherein the first CWS is used for performing channel detection on the first unlicensed carrier.

According to a second aspect of embodiments of the disclosure, there is provided a network device, including a processing unit and a communication unit, wherein the processing unit is configured to determine first information corresponding to a reference time unit on a first unlicensed carrier; and determine a first CWS according to the first information, wherein the first CWS is used for performing channel detection on the first unlicensed carrier.

According to a third aspect of embodiments of the disclosure, there is provided a network device, including: a processor, a memory, a communication interface, and one or more programs, wherein the one or more programs are stored in the memory and configured to be executed by the processor, and the programs include instructions for performing steps in any method according to the first aspect of embodiments of the disclosure.

According to a fourth aspect of embodiments of the disclosure, there is provided a computer-readable storage medium, storing a computer program for electronic data exchange, wherein the computer program causes a computer to execute part or all of the steps described in any method according to the first aspect of embodiments of the disclosure.

According to a fifth aspect, there is provided a computer program product, including a non-transitory computer-readable storage medium storing a computer program, and the computer program is operable to cause a computer to execute part or all of the steps described in any method according to the first aspect of embodiments of the disclosure. The computer program product may be a software installation package.

As can be seen in the embodiments of the disclosure, the network device determines the first information corresponding to the reference time unit on the first unlicensed carrier, and determines the first CWS according to the first information, and the first CWS is used for performing channel detection on the first unlicensed carrier. In this way, the network device flexibly determines the first CWS used for channel detection according to different first information on the first unlicensed carrier, which is beneficial to improve the accuracy of determining the first CWS, such that when the first CWS is used for performing channel detection on the first unlicensed carrier, friendly coexistence of multiple systems on the unlicensed spectrum can be realized, and mutual interference of multiple systems on the unlicensed spectrum can be avoided.

BRIEF DESCRIPTION OF THE DRAWINGS

The following will briefly introduce the drawings needed in the description of the embodiments or related art.

DETAILED DESCRIPTION

The technical solutions in the embodiments of the present disclosure will be described below in conjunction with the drawings according to the embodiments of the present disclosure. Obviously, the described embodiments are only a part of the embodiments of the present disclosure, but not all of the embodiments. Based on the embodiments in this disclosure, all other embodiments obtained by those of ordinary skill in the art without creative work shall fall within the protection scope of this disclosure.

The technical solutions of the embodiments of this disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced long term evolution (LTE-A) system, New Radio (NR) system, NR evolution system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication systems, Wireless Local Area Networks (WLAN), Wireless Fidelity (WiFi), next-generation communication systems or other communication systems.

Generally speaking, traditional communication systems support a limited number of connections and are easy for implementation. However, with the development of communication technology, mobile communication systems will not only support traditional communication, but also support, for example, Device to Device (D2D) communication, Machine to Machine (M2M) communication, machine type communication (MTC), and vehicle to vehicle (V2V) communication, and the like. The embodiments of this disclosure can also be applied to these communication systems.

Figures 1, 2A:
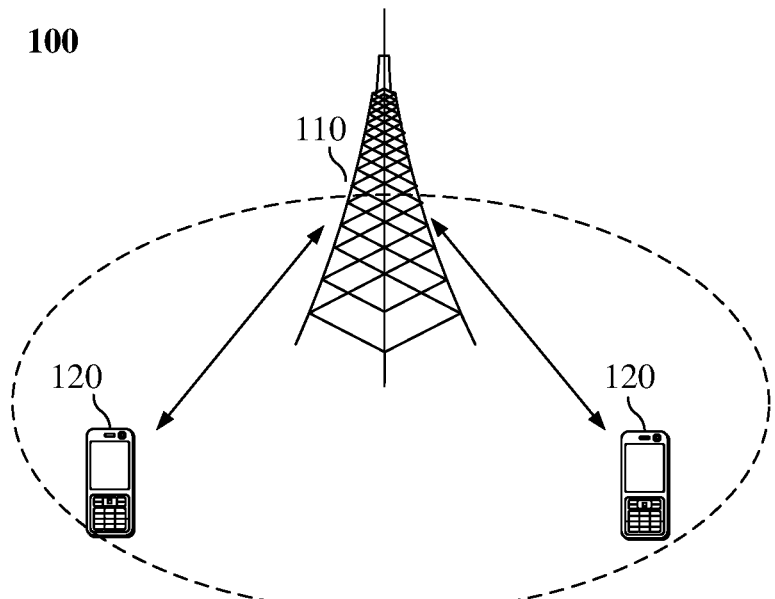
FIG. 1 illustrates a network architecture of a communication system according to an embodiment of the disclosure.
FIG. 2A is a schematic flowchart illustrating a method for determining a CWS according to an embodiment of the disclosure.

Exemplarily, the communication system 100 applied in the embodiments of the present disclosure is shown in FIG. 1. The communication system 100 may include a network device 110, and the network device 110 may be a device that communicates with a terminal device 120 (also referred to as a communication terminal or a terminal). The network device 110 may provide communication coverage for a specific geographic area, and may communicate with terminal devices located in the coverage area. Optionally, the network device 110 may be a base transceiver station (BTS) in GSM system or CDMA system, a NodeB (NB) in WCDMA system, an evolutional Node B (eNB or eNodeB) in LTE system, or a wireless controller in cloud radio access network (CRAN). Alternatively, the network device may be a mobile switching center, a relay station, an access point, a vehicle-mounted device, a wearable device, a hub, a switch, a bridge, a router, a network-side device in 5G networks, a network device in the future evolution of Public Land Mobile Network (PLMN), or the like.

The communication system 100 also includes at least one terminal device 120 located within the coverage area of the network device 110. Connection to the "terminal device" used here includes but is not limited to connection via wired lines, such as via public switched telephone networks (PSTN), digital subscriber lines (Digital Subscriber Line, DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter; and/or via another terminal device that is configured to receive/send communication signals; and/or via an Internet of Things (IoT) device. A terminal device configured to communicate through a wireless interface may be referred to as a "wireless communication terminal", a "wireless terminal" or a "mobile terminal". Examples of mobile terminals include, but are not limited to, a satellite or cellular phone; a personal communications system (PCS) terminals that can combine cellular radio phones with data processing, fax, and data communication capabilities; a PDA including functions of radio phone, pager, internet/intranet access, web browser, memo pad, calendar, and/or global positioning system (GPS) receiver; a conventional laptop and/or a palmtop receiver or other electronic devices including radio phone transceivers. The terminal devices may be also referred to as access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a session initiation protocol (SIP) phone, a wireless local loop (WLL) station, a personal digital assistant (PDA), a handheld device or a computing device with wireless communication function, other processing devices connected to wireless modems, in-vehicle devices, wearable devices, terminal devices in 5G networks, terminal devices in the future evolution of PLMN, or the like.

Optionally, device to device (D2D) communication may be performed between the terminal devices 120.

Optionally, the 5G system or 5G network may also be referred to as New Radio (NR) system or NR network.

FIG. 1 exemplarily illustrates one network device and two terminal devices. Optionally, the communication system 100 may include multiple network devices and the coverage of each network device may include other numbers of terminal devices. The embodiments of the disclosure are not limited thereto.

Optionally, the communication system 100 may also include other network entities such as a network controller and a mobility management entity, which are not limited in the embodiments of the disclosure.

It should be understood that the devices with communication functions in the network/system in the embodiments of the disclosure may be referred to as communication devices. Taking the communication system 100 shown in FIG. 1 as an example, the communication device may include a network device 110 and a terminal device 120 with communication functions, and the network device 110 and the terminal device 120 may be the specific devices as described above, which will not be repeated here. The communication device may also include other devices in the communication system 100, such as other network entities including a network controller and a mobility management entity, which are not limited in the embodiments of the disclosure.

It should be understood that the terms "system" and "network" in this disclosure may be used interchangeably. The term "and/or" in this disclosure refers to an association relationship describing associated objects, which means that there can be three relationships, for example, A and/or B may be understood as three situations: A exists alone, A and B exist at the same time, or B exists alone. In addition, the character "/" in this disclosure generally indicates that the associated objects before and after are in an "or" relationship.

The method according to the embodiments of the disclosure can be applied to communication of unlicensed spectrum, and can also be applied to other communication scenarios, such as a communication scenario of licensed spectrum.

Unlicensed spectrum is a spectrum divided by the country and region that can be used for radio equipment communication. This spectrum can be considered as a shared spectrum, that is, the communication equipment in different communication systems can use this spectrum as long as it meets regulatory requirements provided by the country or region on the spectrum, without necessary to apply for a proprietary spectrum authorization from the government. In order to allow various communication systems that use unlicensed spectrum for wireless communication to coexist friendly on this spectrum, communication equipment can follow the principle of Listen Before Talk (LBT) when communicating on unlicensed spectrum. In other words, before a communication device transmits signals on the channels of the unlicensed spectrum, it needs to perform channel listening (also referred to as channel detection/sensing) first. Only when the channel listening result is that the channel is idle, the communication device can transmit signals; if the channel listening result performed by the communication device on the unlicensed spectrum is that the channel is busy, signal transmission cannot be performed. Optionally, a bandwidth of the LBT is 20 MHz, or an integer multiple of 20 MHz.

In the embodiments of the disclosure, the communication device may adopt a corresponding channel access scheme to perform LBT operation. To facilitate understanding, several channel access schemes are introduced below.

Category 1 (Cat-1LBT): transmission is performed immediately after a switching gap ends. In other words, there is no need to detect whether the channel is idle. This channel access scheme of Category 1 is suitable for transmission switching within one channel occupancy time (COT). The switching gap may not exceed a certain period of time, for example, 16 μs.

Category 2 (Cat-2LBT): it can be referred to as LBT without random backhaul. Signal transmission can be performed when the channel is idle within a single detection time, and signal transmission cannot be performed when the channel is occupied.

Category 3 (Cat-3LBT): LBT with random backhaul based on a fixed contention window size (CWS). At this time, the communication device determines that CWS is CWp, where CWp is a fixed value. The communication device generates a random number N according to the value of CWp, and performs channel detection on the unlicensed spectrum. After channel detection succeeds in all N time slots, that is, when the channel is detected to be idle in all N time slots, the communication device can perform signal transmission.

Category 4 (Cat-4LBT): LBT with random backhaul based on variable CWS. At this time, the communication device determines that CWS is CWp and CWp is a variable value. The communication device generates a random number N according to the value of CWp, and performs channel detection on the unlicensed spectrum. After channel detection succeeds in all N time slots, that is, when the channel is detected to be idle in all N time slots, the communication device can perform signal transmission.

As an example, a specific implementation of the above Cat-4LBT channel access scheme is described as follows.

1) A counter is set as N=$N_{init}$, where $N_{init}$ is a random number uniformly distributed between 0 and CWp.

2) Clear channel assessment (CCA) time slot detection is performed on the channel. If the CCA time slot detection is successful, the above counter is decreased by 1; otherwise, channel detection is performed until the detection is successful.

3) If the channel is detected to be busy, the channel idle state needs to be detected for a certain period of time before the CCA time slot detection can be restored.

4) When N=0, the channel detection process ends, and the network device can transmit downlink signals such as a physical downlink shared channel (PDSCH) or a physical downlink control channel (PDCCH).

Herein, the contention window size CWS is a certain value used for channel detection on unlicensed channels, and the number of time slots for CAA on the unlicensed channels can be determined according to this value.

From the above description, the difference between Cat-3LBT and Cat-4LBT lies in whether CWS is a fixed value or a variable value. More preferred channel access schemes may be Cat-1LBT, Cat-2LBT and Cat-4LBT.

In addition, as to Cat-3LBT and Cat-4LBT, priorities of the channel access schemes can be further determined according to the priority of the transmission service. In other words, Cat-3LBT and Cat-4LBT may further include different channel access sub-schemes, and different channel access sub-schemes may correspond to service transmission with different priorities. Herein, Cat-4LBT corresponding to transmission services with different priorities is shown below in Table 1. The disclosure mainly describes how to determine the value of CWS in the Cat-4LBT scheme.

Referring to FIG. 2A, which illustrates a method for determining the contention window size CWS according to an embodiment of the disclosure, it is applicable to the network device in the above-mentioned communication system, and the method includes some or all of the following steps.

In step 201, the network device determines first information corresponding to a reference time unit on a first unlicensed carrier.

Herein, the first unlicensed carrier may be any unlicensed carrier, and the reference time unit includes a part of time units or all time units in a reference time period.

Optionally, when the reference time unit includes a part of time units in the reference time period, the reference time unit may include one time unit or multiple time units in the reference time period. For example, it may include the first time slot/subframe or the first two time slots/subframes in the reference time period. For another example, when the subcarrier spacing (SCS) is 15 kHz/30 kHz, it may include the first time slot or the first two time slots in the reference time period. For still another example, when the SCS is 60 kHz, it may include the first two time slots or the first four time slots in the reference time period. The embodiments are not limited thereto.

Optionally, the reference time unit may also be a time unit of downlink transmission included in the reference time period, or a time unit of uplink transmission included in the reference time period, or a time unit of uplink transmission and downlink transmission included in the reference time period.

In a possible example, the reference time period is in an association relationship with a preset parameter group, and the preset parameter group includes any of the following groups: a start position and a first length; an end position and a second length; the start position and the end position.

Optionally, the start position is a start time point of one downlink burst, or the start position is a start time point of one channel occupancy time initiated by a base station, or the start position is a start time point of one uplink burst, or the start position is a start time point of one channel occupancy time initiated by a terminal device.

Optionally, the first length includes a length of one downlink burst, or the first length includes a length of one channel occupancy time initiated by the base station, or the first length includes a maximum length of one channel occupancy time initiated by the base station; or, the first length includes a length of one uplink burst, or the first length includes a length of one channel occupancy time initiated by the terminal device, or the first length includes a maximum length of one channel occupancy time initiated by the terminal device.

Optionally, the end position is determined by the network device according to a first offset value, wherein the first offset value is pre-configured or protocol-provided, or the first offset value is determined according to a processing capability of the base station; or, the end position is an end time point of one burst, or the end position is an end time point of one channel occupancy time.

Optionally, the second length is pre-configured or protocol-provided.

Optionally, the second length includes the length of one channel occupancy time, or the second length includes a maximum length of one channel occupancy time, or the second length includes a length of one downlink burst, or the second length includes a length of one uplink burst.

Herein, the maximum channel occupancy time (MCOT) refers to a maximum length of time allowed to perform signal transmission using channels of unlicensed spectrum after successful LBT. Different channel access priorities correspond to different MCOTs. A current maximum value of MCOT is 10 ms. It should be understood that the MCOT is the time occupied by signal transmission.

The channel occupancy time (COT) refers to a length of time for signal transmission using channels of unlicensed spectrum after successful LBT. Channel occupancy of the signal may be discontinuous during this time period. Herein, one COT cannot exceed 20 ms at most, and the time length occupied by signal transmission within the COT does not exceed MCOT.

The downlink burst refers to a group of downlink transmissions (i.e., including one or more downlink transmissions) performed by the base station. Such group of downlink transmissions is continuous (i.e., there is no gap between multiple downlink transmissions), or there is a gap in the group of downlink transmissions but the gap is less than or equal to a preset value, for example, 16 µs. If a gap between two downlink transmissions performed by the base station is greater than the preset value (e.g., 16 µs), the two downlink transmissions are considered to belong to two downlink bursts.

The uplink burst refers to a group of uplink transmissions (i.e., including one or more uplink transmissions) performed by the terminal device. Such group of uplink transmissions is continuous (i.e., there is no gap between multiple uplink transmissions), or there is a gap in the group of uplink transmissions but the gap is less than or equal to a preset value, for example, 16 µs. If a gap between two uplink transmissions performed by the uplink is greater than the preset value (e.g., 16 µs), the two uplink transmissions are considered to belong to two uplink bursts.

Figure 2B:
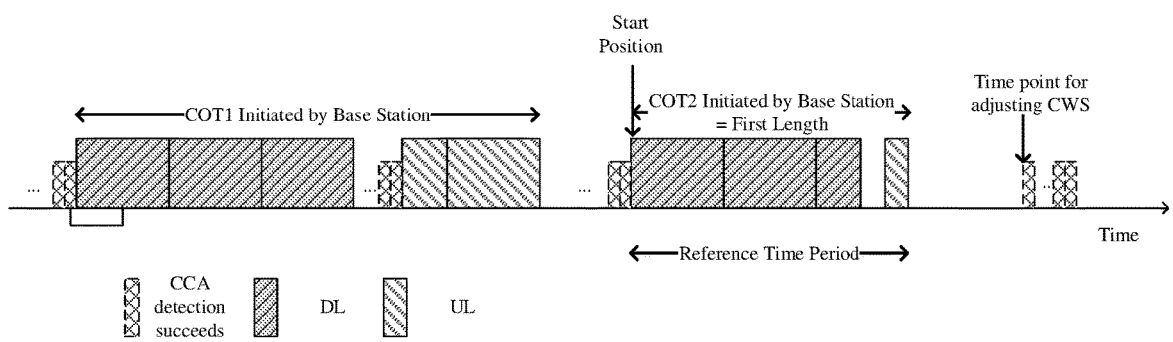
FIG. 2B is a schematic diagram illustrating a reference time period according to an embodiment of the disclosure.

Optionally, when the reference time period is associated with the start position and the first length, the downlink burst corresponding to the start position and the first length is the most recent downlink burst before the network device determines the first information; or, the channel occupancy time initiated by the base station is the most recent channel occupancy time before the network device determines the first information. As shown in FIG. 2B, the start time point of the reference time period is a start time point of the most recent channel occupancy time before determining the first information, and the reference time period is determined by adding the first length based thereon.

Figure 2C:
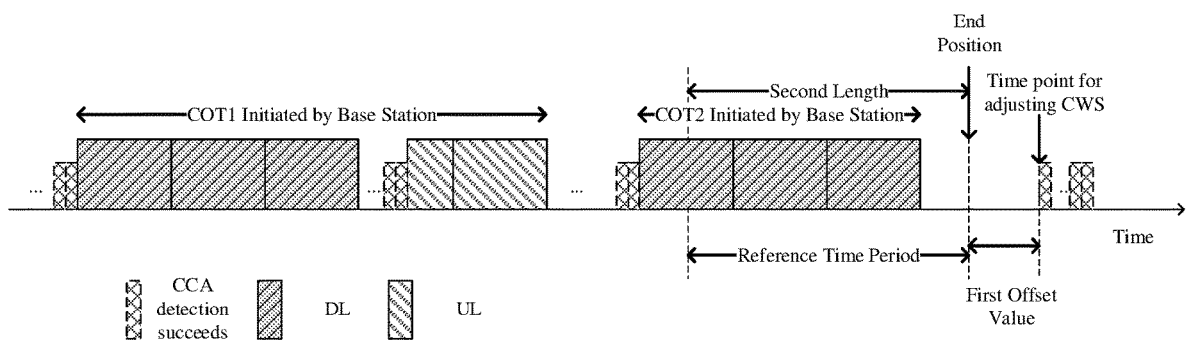
FIG. 2C is a schematic diagram illustrating another reference time period according to an embodiment of the disclosure.

Optionally, when the reference time period is associated with the end position and the second length, the end position of the reference time period is derived by reducing the time point when the network device determines the first information by a first offset value, as shown in FIG. 2C, and the reference time period is determined based on a second length of time period before the end position.

In this example, the first offset value corresponds to a processing time for the base station demodulating the first information corresponding to the reference time period, thereby ensuring that the base station effectively obtains the first information when performing channel access.

Optionally, when the reference time period is associated with the start position and the end position, the reference time period is a time period between the start position and the end position.

In a possible example, the first information includes any one or combination of following types of information: hybrid automatic repeat-request acknowledgement HARQ-ACK information corresponding to a physical downlink shared channel (PDSCH) transmitted on the reference time unit; HARQ-ACK information on the reference time unit; information of the terminal device transmitting the HARQ-ACK information on the reference time unit; information on whether a transport block TB in physical uplink shared channel (PUSCH) on the reference time unit is correctly decoded; and information on whether a physical random access channel (PRACH) sequence is detected in PRACH resource on the reference time unit.

Optionally, the HARQ-ACK information on the reference time unit includes HARQ-ACK information carried in PUCCH, or uplink control information (UCI) only on PUSCH, or UCI on PUSCH transmitted on the reference time unit.

It should be understood that when the first information includes uplink information on the reference time unit, such as HARQ-ACK information, it can be considered that the network device expects to receive the HARQ-ACK information on the reference time unit, but it cannot be considered that the terminal device definitely sends the HARQ-ACK information on the reference time unit. For example, the network device schedules PDSCH transmission, and indicates the HARQ-ACK information corresponding to the PDSCH transmission to be transmitted through PUCCH resource on the reference time unit. After the terminal device decodes the PDSCH to obtain the HARQ-ACK information, it performs LBT before the reference time unit. If the LBT succeeds, the HARQ-ACK information is transmitted on the PUCCH resource; if the LBT fails, the HARQ-ACK information is not transmitted on the PUCCH resource. Alternatively, the terminal device does not receive a downlink grant for the network device to schedule the PDSCH transmission, it will not transmit the HARQ-ACK information on the PUCCH resource. Regardless of whether the terminal device transmits the HARQ-ACK information on the PUCCH resource, the network device will detect the HARQ-ACK information on the PUCCH resource.

As can be seen in this example, the first information includes at least one of multiple kinds of information, and different first information may correspond to different first CWSs, thereby being beneficial to improve the comprehensiveness of the first information and the accuracy of determining of the first CWS.

In step 202, the network device determines the first CWS according to the first information, and the first CWS is used for performing channel detection on the first unlicensed carrier.

As can be seen in the embodiments of the disclosure, the network device determines the first information corresponding to the reference time unit on the first unlicensed carrier, and determines the first CWS according to the first information, and the first CWS is used for performing channel detection on the first unlicensed carrier. In this way, the network device flexibly determines the first CWS used for channel detection according to different first information on the first unlicensed carrier, which is beneficial to improve the accuracy of determining the first CWS, such that when the first CWS is used for performing channel detection on the first unlicensed carrier, friendly coexistence of multiple systems on the unlicensed spectrum can be realized, and mutual interference of multiple systems on the unlicensed spectrum can be avoided.

In a possible example, the first information includes the HARQ-ACK information, and determining the first CWS according to the first information includes at least one of followings cases: if a proportion of negative acknowledgement (NACK) information in the HARQ-ACK information included in the first information is greater than or equal to a first threshold, determining the first CWS by performing an increase operation on a current second CWS; if the proportion of NACK information in the HARQ-ACK information included in the first information is less than the first threshold, determining the first CWS by performing a decrease operation on the current second CWS or determining the current second CWS as the first CWS.

In some embodiments, the first threshold may be, for example, 80%, or the like, which is not limited herein.

Optionally, if the current second CWS is a CWS as initially set, that is, the current second CWS is taken an initial value, as shown in the following Table 1. Different channel access priorities correspond to different value ranges of CWS, and the initial value is the minimum value in the value range of CWS.

Optionally, the determining the first CWS for channel detection on the first unlicensed carrier according to the first information includes: determining the first CWS, which is used for channel detection on the first unlicensed carrier based on a first channel access priority, according to the first information and the first channel access priority.

Optionally, the increase operation, which is mentioned in determining the first CWS by performing an increase operation on a current second CWS, may refer to increasing the current second CWS to a next larger number within the CWS range under the corresponding priority; or refer to increasing exponentially, for example, by the power of 2; or refer to increasing linearly; which is not limited herein. If the current second CWS is the maximum value in the CWS range under the corresponding priority, the increase operation refers to keeping the current second CWS unchanged as the first CWS. However, after the maximum value is maintained for K times, the first CWS is reset to the initial value, where K is a number determined by the network device from 1 to 8 according to the channel access priority.

Optionally, the determining the first CWS by performing a decrease operation on the current second CWS may refer to: determining the first CWS to be the smallest value in the CWS value range under the corresponding priority through the decrease operation, for example, the minimum value when the priority is 1 in Table 1; or, determining the first CWS as the initial value under the corresponding priority.

Optionally, upon determining the first CWS by performing the decrease operation on the current second CWS or determining the current second CWS as the first CWS, if the current second CWS is the initial value, that is, the minimum value in the CWS range under the corresponding priority, the current second CWS is determined as the first CWS. If the current second CWS is not the minimum value in CWS range under the corresponding priority, the first CWS may be determined by decreasing the current second CWS to the initial value or the minimum value of the CWS under the corresponding priority in Table 1; or the first CWS may be determined by decreasing the current second CWS to the next smaller number within the corresponding CWS range of the priority in Table 1; or the first CWS may be determined by exponentially decreasing the current second CWS, for example, by the power of 2; or the first CWS may be determined by linearly decreasing the current second CWS; which is not limited herein.

As can be seen in this example, the network device determines the first CWS determination manner according to the proportion of NACK information in the HARQ-ACK information included in the first information, that is, determines the channel conditions on the first unlicensed carrier according to the NACK information, and then determines the first CWS, thereby helping to improve the accuracy of the first CWS.

TABLE 1

Downlink channel access parameters

| Channel Access Priority (p) | Minimum value of CWS | Maximum value of CWS | Maximum COT | CWS Range |
|---|---|---|---|---|
| 1 | 3 | 7 | 2 ms | {3, 7} |
| 2 | 7 | 15 | 3 ms | {7, 15} |
| 3 | 15 | 63 | 8 or 10 ms | {15, 31, 63} |
| 4 | 15 | 1023 | 8 or 10 ms | {15, 31, 63, 127, 255, 511, 1023} |

In this possible example, the first information includes the first HARQ-ACK information corresponding to the PDSCH transmitted on the reference time unit, and the proportion of NACK information in the HARQ-ACK information included in the first information is determined based on at least one of the following cases.

If the first HARQ-ACK information is transmitted through a licensed carrier, the PDSCH corresponding to the first HARQ-ACK information is scheduled through the physical downlink control channel (PDCCH) on the first unlicensed carrier, and the first HARQ-ACK information is not detected by the network device, then the first HARQ-ACK information is determined as NACK information.

Optionally, "the first HARQ-ACK information is determined as NACK information" described in this embodiment of the disclosure, and "the first HARQ-ACK information is determined as NACK information" and "the second HARQ-ACK information is determined as NACK information" described below, can be understood as that the number of NACK information is increased according to the number of HARQ-ACK information determined as the NACK information, thereby being used to calculate the proportion of NACK information in HARQ-ACK information. A specific formula for calculating the proportion of NACK information in the HARQ-ACK information is "the number of NACK information/(the number of NACK information+the number of ACK information)".

If the first HARQ-ACK information is transmitted through a licensed carrier, the PDSCH corresponding to the first HARQ-ACK information is scheduled through the PDCCH on a carrier other than the first unlicensed carrier, and the first HARQ-ACK information is not detected by the network device, then the first HARQ-ACK information is not used for determining the proportion of the NACK information.

Optionally, "the first HARQ-ACK information is not used for determining the proportion of the NACK information" described in this embodiment of the disclosure, and "the first HARQ-ACK information is not used for determining the proportion of the NACK information" and "the second HARQ-ACK information is not used for determining the proportion of the NACK information" described below, can be understood as ignoring the first HARQ-ACK information or the second HARQ-ACK information this time. In other words, the first HARQ-ACK information or the second HARQ-ACK information is not used to calculate the proportion of NACK information in the HARQ-ACK information.

Herein, scheduling on carriers other than the first unlicensed carrier may be, for example, cross-carrier scheduling including a licensed carrier scheduling or another unlicensed carrier scheduling, which is not limited here.

If the first HARQ-ACK information is transmitted through a second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is not used for determining the proportion of the NACK information.

Herein, the second unlicensed carrier may be another unlicensed carrier other than the first unlicensed carrier, which is not limited here.

It can be seen that in this case, the network device considers that the probability of the terminal device not transmitting PUCCH is relatively high, so the first HARQ-ACK information is ignored and not used for determining the proportion of NACK information, thereby reducing the proportion of NACK information. In this way, the first CWS is adjusted so that the network device can access the channel as soon as possible.

If the first HARQ-ACK information is transmitted through the second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is determined as NACK information.

It can be seen that in this case, the network device considers that the probability of the terminal device not detecting the downlink (DL) grant is relatively high, so it determines the first HARQ-ACK information as NACK information, and adjusts the first CWS while increasing the proportion of NACK information.

Alternatively, other auxiliary information (e.g., channel state information (CSI) feedback on each carrier, the proportion of terminal devices performing transmission on the PUCCH resource, etc.) can also be used to determine that the above-mentioned terminal device has a higher probability of not transmitting PUCCH or has a higher probability of not detecting the DL grant, thereby determining whether the first HARQ-ACK information is used to determine the proportion of the NACK information.

If the first HARQ-ACK information is transmitted through the second unlicensed carrier, the PDSCH corresponding to the first HARQ-ACK information is scheduled through the PDCCH on a carrier other than the first unlicensed carrier, and the first HARQ-ACK information is not detected by the network device, then the first HARQ-ACK information is not used for determining the proportion of the NACK information.

It can be seen that in this case, no matter the terminal device does not detect the DL grant or the terminal device does not transmit PUCCH, it does not occur on the carrier where the first CWS is to be adjusted, so it is not counted as a NACK.

If the first HARQ-ACK information is transmitted through a licensed carrier, the PDSCH corresponding to the first HARQ-ACK information is transmitted through a first subband on the first unlicensed carrier, the PDSCH corresponding to the first HARQ-ACK information is scheduled through a PDCCH on a second subband on the first unlicensed carrier, the first CWS is used for performing channel detection on the first subband, and the first HARQ-ACK information is not detected by the network device, then the first HARQ-ACK information is not used for determining the proportion of the NACK information.

It can be seen that in this case, not detecting the HARQ-ACK information on the licensed carrier is likely because the terminal device does not receive the DL grant, which indicates that there may be interference in the subband transmitting the DL grant. The loss of the DL grant transmitted on subband 2 will not have a negative impact on the channel detection of subband 1.

If the first HARQ-ACK information is transmitted through a licensed carrier, the PDSCH corresponding to the first HARQ-ACK information is transmitted through the first subband on the first unlicensed carrier, and the PDSCH corresponding to the first HARQ-ACK information is scheduled through the PDCCH on the second subband on the first unlicensed carrier, the first CWS is used for performing channel detection on a third subband, the third subband includes at least the second subband, and the first HARQ-ACK information is not detected by the network device, then the first HARQ-ACK information is determined as NACK information.

It can be seen that in this case, not detecting the HARQ-ACK information on the licensed carrier is likely because the terminal device does not receive the DL grant, which indicates that there may be interference on the subband transmitting the DL grant. For channel detection on the third subband, that is, for performing joint detection on multiple subbands including the second subband, the interference of each subband needs to be considered. Therefore, the influence of the loss of the DL grant transmitted on subband 2 should also be considered in the broadband channel detection.

In a possible example, the first information includes at least part of the second HARQ-ACK information on the reference time unit, and the proportion of NACK information in the HARQ-ACK information included in the first information is determined based on at least one of following cases.

If channel detection is not performed before the second HARQ-ACK information is transmitted, the PDSCH corresponding to the second HARQ-ACK information is scheduled through the PDCCH on the first unlicensed carrier, and the second HARQ-ACK is not detected by the network device, then the second HARQ-ACK information is determined as NACK information.

Herein, the description regarding that the second HARQ-ACK information is determined as NACK information is the same as the foregoing description regarding that the first HARQ-ACK information is determined as NACK information, and will not be repeated here.

Optionally, channel detection is not performed may refer to that the channel access scheme is Cat-1LBT.

It can be seen that in this case, the terminal device must be able to transmit PUCCH. So, if the PUCCH is not detected, it is because the terminal device does not detect the DL grant. The impact of the loss of the DL grant on the first unlicensed carrier should also be considered in the channel access, thereby enhancing the comprehensiveness of the first CWS determination.

If channel detection is not performed before the second HARQ-ACK information is transmitted, the PDSCH corresponding to the second HARQ-ACK information is scheduled through the PDCCH on a carrier other than the first unlicensed carrier, and the second HARQ-ACK information is not detected by the network device, then the second HARQ-ACK information is not used for determining the proportion of the NACK information.

Optionally, channel detection is not performed may refer to that the channel access scheme is Cat-1LBT.

It can be seen that in this case, the terminal device must be able to transmit PUCCH. So, if the PUCCH is not detected, it is because the terminal device does not detect the DL grant, which does not belong to the loss of the DL grant on the first unlicensed carrier. The impact thereof should not be considered in the channel access on the first unlicensed carrier, thereby avoiding unnecessary backoff.

If channel detection is performed before transmission of the second HARQ-ACK information, the PDSCH corresponding to the second HARQ-ACK information is scheduled through the PDCCH on the first unlicensed carrier, and the second HARQ-ACK information is not detected by the network device, then the second HARQ-ACK information is determined as NACK information.

Optionally, the channel detection scheme may be Cat-2 or Cat-4LBT, which is not limited here.

It can be seen that in this case, no matter the terminal device does not transmit PUCCH or the terminal device does not detect DL grant, both cases indicate that the channel condition on the first unlicensed carrier may not be very good, and it should be considered in the channel access.

If channel detection is performed before the second HARQ-ACK information is transmitted, the PDSCH corresponding to the second HARQ-ACK information is scheduled through the PDCCH on a carrier other than the first unlicensed carrier, and the second HARQ-ACK information is not detected by the network device, then the second HARQ-ACK information is determined as NACK information.

Optionally, the channel detection scheme may be Cat-2 or Cat-4LBT, which is not limited here.

It can be seen that in this case, the network device considers there is a higher probability that the terminal device dose not transmit the PUCCH. Therefore, the second HARQ-ACK information is determined as NACK information, the first CW is adjusted while increasing the proportion of NACK information.

If channel detection is performed before the second HARQ-ACK information is transmitted, the PDSCH corresponding to the second HARQ-ACK information is scheduled through the PDCCH on a carrier other than the first unlicensed carrier, and the second HARQ-ACK information is not detected by the network device, then the second HARQ-ACK information is not used for determining the proportion of the NACK information.

Optionally, the channel detection scheme may be Cat-2 or Cat-4LBT, which is not limited here.

It can be seen that in this case, the network device considers there is a higher probability that the terminal device does not detect the DL grant. So, the second HARQ-ACK information is ignored and not used for determining the proportion of the NACK information, thereby reducing the NACK information. In this way, the first CWS is adjusted to enable network devices to access the channel as soon as possible. Alternatively, other auxiliary information (e.g., CSI feedback on each carrier, the proportion of terminal devices performing transmission on the PUCCH resource, etc.) can also be used to determine that the above-mentioned terminal device has a higher probability of not transmitting PUCCH or has a higher probability of not detecting the DL grant, thereby determining whether the second HARQ-ACK information is used to determine the proportion of the NACK information.

Optionally, the foregoing first information includes at least part of the second HARQ-ACK information on the reference time unit, and the at least part of the second HARQ-ACK information may be HARQ-ACK information corresponding to the PDSCH on a certain reference time unit. or HARQ-ACK information corresponding to transmission of some high-priority channel access schemes, or HARQ-ACK information transmitted by some reference terminal devices, or HARQ-ACK information corresponding to initially transmitted PDSCH. The embodiment is not limited thereto.

In this possible example, the PDSCH corresponding to the at least part of the second HARQ-ACK information is transmitted through the first unlicensed carrier.

It can be seen that in this example, the network device uses the PDSCH transmitted on the first unlicensed carrier to determine the first CWS on the first unlicensed carrier, which is beneficial to improve the accuracy of determining the first CWS.

In a possible example, the first information includes information of the terminal device that transmits HARQ-ACK information on the reference time unit, and the determining the first CWS according to the first information includes at least one of the following cases.

If a proportion of terminal devices with HARQ-ACK information being not detected by the network device on the reference time unit is greater than or equal to a second threshold, the first CWS is determined by performing an increase operation on a current second CWS.

If the proportion of terminal devices with HARQ-ACK information being not detected by the network device on the reference time unit is less than the second threshold, the first CWS is determined by performing a decrease operation on the current second CWS or the current second CWS is determined as the first CWS.

If the proportion of terminal devices with HARQ-ACK information being detected by the network device on the reference time unit is less than a third threshold, the first CWS is determined by performing an increase operation on a current second CWS.

If the proportion of terminal devices with HARQ-ACK information being detected by the network device on the reference time unit is greater than or equal to the third threshold, the first CWS is determined by performing a decrease operation on the current second CWS or the current second CWS is determined as the first CWS.

Optionally, the second threshold may be, for example, 80%, and the third threshold may be, for example, 10%, which is not limited here.

Herein, as to performing the increase operation on the current second CWS to determine the first CWS, or performing the decrease operation on the current second CWS to determine the first CWS, or determining the current second CWS as the first CWS, embodiments thereof may refer to the above description.

It can be seen that in this example, when the base station schedules multiple terminal devices to perform PUCCH or UCI transmission on the same uplink time unit (i.e., the reference time unit), but fails to detect the PUCCH or UCI sent by a certain percentage of terminal devices on this time unit, it can be considered that the interference on the channel is relatively great, so that the increase operation is performed on the current second CWS to determine the first CWS.

In a possible example, the first information includes information on whether at least part of the TB in the PUSCH on the reference time unit is correctly decoded, and the determining the first CWS according to the first information includes at least one of following cases.

If a proportion of TBs successfully received by the network on the reference time unit is less than a fourth threshold, the first CWS is determined by performing an increase operation on the current second CWS.

If the proportion of TBs successfully received by the network device on the reference time unit is greater than or equal to the fourth threshold, the first CWS is determined by performing a decrease operation on the current second CWS or the current second CWS is determined as the first CWS.

Optionally, the fourth threshold may be 10%, which is not limited here.

Herein, as to performing the increase operation on the current second CWS to determine the first CWS, or performing the decrease operation on the current second CWS to determine the first CWS, or determining the current second CWS as the first CWS, embodiments thereof may refer to the above description and will not be repeated here.

In this possible example, the channel access scheme corresponding to the at least part of PUSCH includes at least one of Category 1 channel detection, Category 2 channel detection, and Category 4 channel detection with the highest channel access priority.

Optionally, Category 4 with the highest channel access priority corresponds to the priority when the channel access priority is 1 in Table 1 above.

Optionally, if the channel access scheme corresponding to the PUSCH is Cat-4 with other channel access priorities except the highest priority, the decoding result of the corresponding TB is ignored and not used for determining the first CWS.

It can be seen that in this example, when the proportion of TBs successfully received by the network device is small, it can be considered that the interference on the channel is great, so that the increase operation is performed on the current second CWS to determine the first CWS. When the proportion of successfully receiving TB is large, it can be considered that the interference on the channel is small, so that the current second CWS is reduced to determine the first CWS or the current second CWS is determined as the first CWS, so as to improve the accuracy of the first CWS.

In a possible example, the at least part of the PUSCH includes the PUSCH for transmitting Message 3 in a random access procedure, and the proportion of TBs successfully received by the network device on the reference time unit is determined based on at least one of following cases.

If the PUSCH on the reference time unit is used for transmitting a first TB, the first TB includes the Message 3, and the first TB is successfully received by the network device, then the first TB is used for determining the proportion of TBs successfully received.

If the PUSCH on the reference time unit is used for transmitting the first TB, the first TB includes the Message 3, and the first TB is not successfully received by the network device, then the first TB is not used for determining the proportion of TBs successfully received.

It can be seen that in this example, during the four-step random access procedure, Message 3 may be collided. Therefore, when the decoding result is wrong, it may not be used for adjusting the first CWS. The correct decoding result can indicate good channel quality and can be used for adjusting the first CWS.

In a possible example, the first information includes information on whether a PRACH sequence is detected in the PRACH resource on the reference time unit, and the determining the first CWS according to the first information includes at least one of the following cases.

If the PRACH sequence is not detected by the network device in the PRACH resource on the reference time unit, the first CWS is determined by performing an increase operation on a current second CWS or the current second CWS is determined as the first CWS.

If at least one PRACH sequence is detected by the network device in the PRACH resource on the reference time unit, the first CWS is determined by performing a decrease operation on a current second CWS.

Herein, as to performing the increase operation on the current second CWS to determine the first CWS, or performing the decrease operation on the current second CWS to determine the first CWS, or determining the current second CWS as the first CWS, embodiments thereof may refer to the above description and will not be repeated here.

It can be seen that in this example, if a PRACH resource is included in the reference time unit, when the network device detects a PRACH sequence on the PRACH resource, it indicates that a terminal device has successfully performed PRACH sequence transmission on the PRACH resource, and the channel conditions are good, such that a decrease operation can be performed on the current second CWS to determine the first CWS. If the network device does not detect the PRACH sequence on the PRACH resource, the network device cannot determine whether there is no terminal device performing PRACH sequence transmission on the PRACH resource or there is any terminal device performing PRACH sequence transmission without being detected due to poor channel quality. In this case, the first CWS may be determined by performing the increase operation on the current second CWS, or the current second CWS may be determined as the first CWS.

In a possible example, the first information further includes information on whether a public PDSCH on the reference time unit is transmitted, where the public PDSCH includes at least one of the following: a random access response, a paging message, a system message.

In this possible example, the determining the first CWS according to the first information includes if the public PDSCH is not transmitted on the reference time unit, determining the first CWS by performing a decrease operation on the current second CWS or determining the current second CWS as the first CWS.

Herein, as to performing the decrease operation on the current second CWS to determine the first CWS, or determining the current second CWS as the first CWS, embodiments thereof may refer to the above description and will not be repeated here.

It can be seen that in this example, this type of signal usually appears periodically. If a previous transmission was not successful, in order to increase the next transmission opportunity, the current second CWS may be reduced to determine the first CWS.

Alternatively, in this possible example, the determining the first CWS according to the first information includes if the public PDSCH is not transmitted on the reference time unit, determining the first CWS by performing the increase operation on the current second CWS.

Herein, as to performing the increase operation on the current second CWS to determine the first CWS, embodiments thereof may refer to the above description and will not be repeated here.

Figure 3:
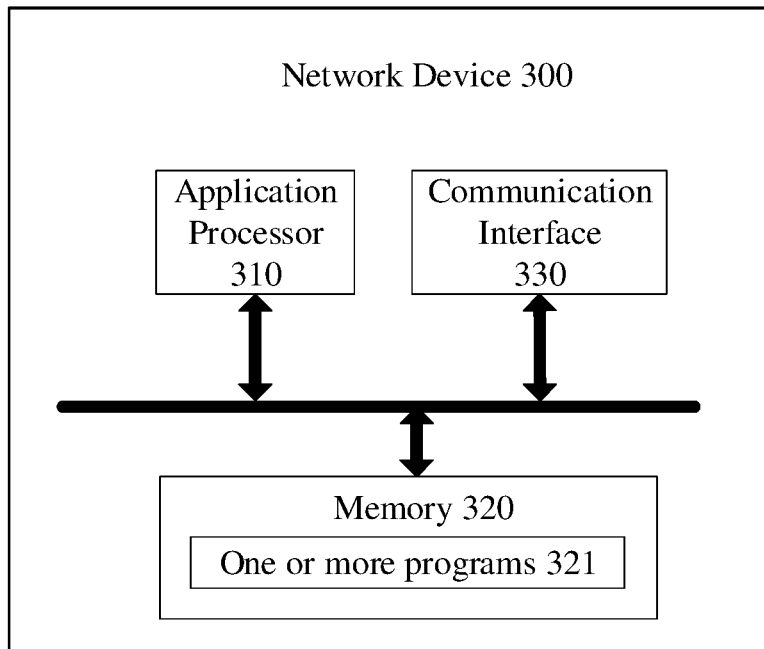
FIG. 3 is a schematic structural diagram illustrating a network device according to an embodiment of the disclosure.

Referring to FIG. 3, corresponding to the embodiment shown in FIG. 2A, FIG. 3 illustrates a block diagram of a network device 300 according to an embodiment of the disclosure. As shown in FIG. 3, the network device 300 includes a processor 310, a memory 320, a communication interface 330, and one or more programs 321, wherein the one or more programs 321 are stored in the memory 320 and are configured to be executed by the processor 310, and the one or more programs 321 include instructions for performing the following steps: determining first information corresponding to a reference time unit on a first unlicensed carrier; and determining a first CWS according to the first information, wherein the first CWS is used for performing channel detection on the first unlicensed carrier.

As can be seen in the embodiments of the disclosure, the network device determines the first information corresponding to the reference time unit on the first unlicensed carrier, and determines the first CWS according to the first information, and the first CWS is used for performing channel detection on the first unlicensed carrier. In this way, the network device flexibly determines the first CWS used for channel detection according to different first information on the first unlicensed carrier, which is beneficial to improve the accuracy of determining the first CWS, such that when the first CWS is used for performing channel detection on the first unlicensed carrier, friendly coexistence of multiple systems on the unlicensed spectrum can be realized, and mutual interference of multiple systems on the unlicensed spectrum can be avoided.

In a possible example, the reference time unit includes a part of time units or all time units in a reference time period.

In this possible example, the reference time period is in an associated relationship with a preset parameter group, and the preset parameter group includes any one of following groups: a start position and a first length; an end position and a second length; the start position and the end position.

In this possible example, the start position is a start time point of one downlink burst, or the start position is a start time point of one channel occupancy time initiated by a base station; the first length includes a length of one downlink burst, or the first length includes a length of one channel occupancy time initiated by the base station, or the first length includes a maximum length of one channel occupancy time initiated by the base station; the end position is determined by the network device according to a first offset value, wherein the first offset value is pre-configured or protocol-provided, or the first offset value is determined according to a processing capability of the base station; or, the end position is an end time point of one burst, or the end position is an end time point of one channel occupancy time; the second length is pre-configured or protocol-provided, and the second length includes a length of one channel occupancy time, or the second length includes a maximum length of one channel occupancy time.

In a possible example, the first information includes any one or combination of following types of information: hybrid automatic repeat request-acknowledgement HARQ-ACK information corresponding to a physical downlink shared channel PDSCH transmitted on the reference time unit; HARQ-ACK information on the reference time unit; information of a terminal device transmitting the HARQ-ACK information on the reference time unit; information on whether a transport block TB in physical uplink shared channel PUSCH on the reference time unit is correctly decoded; information on whether a physical random access channel PRACH sequence is detected in PRACH resource on the reference time unit.

In a possible example, the first information includes the HARQ-ACK information, and as to determining the first CWS according to the first information, the instructions in the one or more programs 321 are specifically configured to execute at least one of following operations: if a proportion of negative acknowledgement NACK information in the HARQ-ACK information included in the first information is greater than or equal to a first threshold, determining the first CWS by performing an increase operation on a current second CWS; if the proportion of NACK information in the HARQ-ACK information included in the first information is less than the first threshold, determining the first CWS by performing a decrease operation on the current second CWS or determining the current second CWS as the first CWS.

In this possible example, the first information includes first HARQ-ACK information corresponding to the PDSCH transmitted on the reference time unit, and the proportion of NACK information in the HARQ-ACK information included in the first information is determined based on at least one of following cases: if the first HARQ-ACK information is transmitted through a licensed carrier, the PDSCH corresponding to the first HARQ-ACK information is scheduled through a physical downlink control channel PDCCH on the first unlicensed carrier, and the first HARQ-ACK information is not detected by the network device, then the first HARQ-ACK information is determined as NACK information; if the first HARQ-ACK information is transmitted through a licensed carrier, the PDSCH corresponding to the first HARQ-ACK information is scheduled through a PDCCH on a carrier other than the first unlicensed carrier, and the first HARQ-ACK information is not detected by the network device, then the first HARQ-ACK information is not used for determining the proportion of NACK information; if the first HARQ-ACK information is transmitted through a second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is not used for determining the proportion of NACK information; if the first HARQ-ACK information is transmitted through the second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is determined as NACK information; if the first HARQ-ACK information is transmitted through the second unlicensed carrier, the PDSCH corresponding to the first HARQ-ACK information is scheduled through the PDCCH on a carrier other than the first unlicensed carrier, and the first HARQ-ACK information is not detected by the network device, then the first HARQ-ACK information is not used for determining the proportion of NACK information; if the first HARQ-ACK information is transmitted through a licensed carrier, the PDSCH corresponding to the first HARQ-ACK information is transmitted through a first subband on the first unlicensed carrier, the PDSCH corresponding to the first HARQ-ACK information is scheduled through a PDCCH on a second subband on the first unlicensed carrier, the first CWS is used for performing channel detection on the first subband, and the first HARQ-ACK information is not detected by the network device, then the first HARQ-ACK information is not used for determining the proportion of NACK information; if the first HARQ-ACK information is transmitted through a licensed carrier, the PDSCH corresponding to the first HARQ-ACK information is transmitted through a first subband on the first unlicensed carrier, the PDSCH corresponding to the first HARQ-ACK information is scheduled through a PDCCH on a second subband on the first unlicensed carrier, the first CWS is used for performing channel detection on a third subband, the third subband includes at least the second subband, and the first HARQ-ACK information is not detected by the network device, then the first HARQ-ACK information is determined as NACK information.

In a possible example, the first information includes at least part of second HARQ-ACK information on the reference time unit, and the proportion of NACK information in the HARQ-ACK information included in the first information is determined based on at least one of following cases: if channel detection is not performed before transmission of the second HARQ-ACK information, a PDSCH corresponding to the second HARQ-ACK information is scheduled through a PDCCH on the first unlicensed carrier, and the second HARQ-ACK information is not detected by the network device, then the second HARQ-ACK information is determined as NACK information; if channel detection is not performed before transmission of the second HARQ-ACK information, the PDSCH corresponding to the second HARQ-ACK information is scheduled through a PDCCH on a carrier other than the first unlicensed carrier, and the second HARQ-ACK information is not detected by the network device, then the second HARQ-ACK information is not used for determining the proportion of NACK information; if channel detection is performed before transmission of the second HARQ-ACK information, the PDSCH corresponding to the second HARQ-ACK information is scheduled through the PDCCH on the first unlicensed carrier, and the second HARQ-ACK information is not detected by the network device, then the second HARQ-ACK information is determined as NACK information; if channel detection is performed before transmission of the second HARQ-ACK information, the PDSCH corresponding to the second HARQ-ACK information is scheduled through a PDCCH on a carrier other than the first unlicensed carrier, and the second HARQ-ACK information is not detected by the network device, then the second HARQ-ACK information is not used for determining the proportion of NACK information.

In this possible example, the PDSCH corresponding to the at least part of the second HARQ-ACK information is transmitted through the first unlicensed carrier.

In a possible example, the first information includes the information of the terminal device transmitting the HARQ-ACK information on the reference time unit, and as to determining the first CWS according to the first information, the instructions in the one or more programs 321 are specifically configured to execute at least one of following operations: if a proportion of terminal devices with HARQ-ACK information being not detected by the network device on the reference time unit is greater than or equal to a second threshold, determining the first CWS by performing an increase operation on a current second CWS; if the proportion of terminal devices with HARQ-ACK information being not detected by the network device on the reference time unit is less than the second threshold, determining the first CWS by performing a decrease operation on the current second CWS or determining the current second CWS as the first CWS; if the proportion of terminal devices with HARQ-ACK information being detected by the network device on the reference time unit is less than a third threshold, determining the first CWS by performing an increase operation on a current second CWS; if the proportion of terminal devices with HARQ-ACK information being detected by the network device on the reference time unit is greater than or equal to the third threshold, determining the first CWS by performing a decrease operation on the current second CWS or determining the current second CWS as the first CWS.

In a possible example, the first information includes information on whether a TB in at least part of PUSCH on the reference time unit is correctly decoded, and as to determining the first CWS according to the first information, the instructions in the one or more programs 321 are specifically configured to execute at least one of following operations: if a proportion of TBs successfully received by the network on the reference time unit is less than a fourth threshold, determining the first CWS by performing an increase operation on a current second CWS; if the proportion of TBs successfully received by the network device on the reference time unit is greater than or equal to the fourth threshold, determining the first CWS by performing a decrease operation on the current second CWS or determining the current second CWS as the first CWS.

In this possible example, a channel access scheme corresponding to the at least part of PUSCH includes at least one of Category 1 channel detection, Category 2 channel detection, and Category 4 channel detection with a highest channel access priority.

In a possible example, the at least part of PUSCH includes a PUSCH for transmitting Message 3 in a random access procedure, and the proportion of TBs successfully received by the network device on the reference time unit is determined based on at least one of following cases: if the PUSCH on the reference time unit is used for transmitting a first TB, the first TB includes the Message 3, and the first TB is successfully received by the network device, then the first TB is used for determining the proportion of TBs successfully received; if the PUSCH on the reference time unit is used for transmitting the first TB, the first TB includes the Message 3, and the first TB is not successfully received by the network device, then the first TB is not used for determining the proportion of TBs successfully received.

In a possible example, the first information includes information on whether the PRACH sequence is detected in the PRACH resource on the reference time unit, and as to determining the first CWS according to the first information, the instructions in the one or more programs 321 are specifically configured to execute at least one of following operations: if the PRACH sequence is not detected by the network device in the PRACH resource on the reference time unit, determining the first CWS by performing an increase operation on a current second CWS or determining the current second CWS as the first CWS; if at least one PRACH sequence is detected by the network device in the PRACH resource on the reference time unit, determining the first CWS by performing a decrease operation on a current second CWS.

In a possible example, the first information further includes information on whether a common PDSCH on the reference time unit is transmitted, and the common PDSCH includes at least one of: a random access response, a paging message, and a system message.

In this possible example, as to determining the first CWS according to the first information, the instructions in the one or more programs 321 are specifically configured to execute following operations: if the common PDSCH is not transmitted on the reference time unit, determining the first CWS by performing a decrease operation on a current second CWS or determining the current second CWS as the first CWS.

The foregoing describes the solution of embodiments of the disclosure mainly from the perspective of interaction between various network elements. It can be understood that, in order to implement the above-mentioned functions, the network device includes hardware structures and/or software modules corresponding to various functions. Those skilled in the art should realize that in combination with the units and algorithm steps of the examples described in the embodiments disclosed herein, the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the disclosure.

According to the embodiments of the disclosure, the network device may be divided into functional units based on the foregoing method examples. For example, each functional unit may be divided corresponding to each function, or two or more functions may be integrated into one processing unit. The above-mentioned integrated unit can be realized in the form of hardware or software program module. It should be noted that the division of units in the embodiments of the disclosure is only illustrative as a logical function division, and there may be other division manners in actual implementation.

Figure 4:
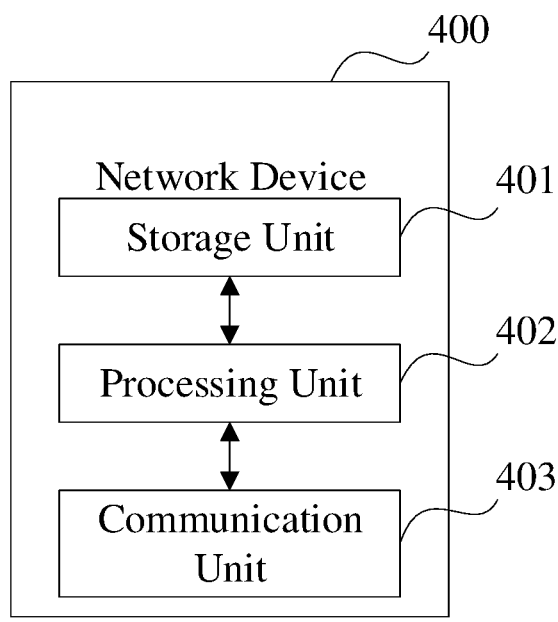
FIG. 4 is a block diagram illustrating functional units of a network device according to an embodiment of the disclosure.

In the case of integrated units, FIG. 4 illustrates a block diagram of possible functional units of the network device involved in the foregoing embodiments. The network device 400 includes a processing unit 402 and a communication unit 403. The processing unit 402 is configured to control and manage the operations of the network device. For example, the processing unit 402 is configured to support the network device to perform step 201 and step 202 in FIG. 2A and/or other processes used in the technology described herein. The communication unit 403 is configured to support communication between the network device and other devices. The network device may also include a storage unit 401 configured to store program codes and data of the terminal.

The processing unit 402 may be a processor or a controller, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof, which can implement or execute various exemplary logical blocks, modules and circuits described in conjunction with the disclosure of the disclosure. The processor may also be a combination that implements computing functions, for example, a combination of one or more microprocessors, a combination of a DSP and a microprocessor, and so on. The communication unit 403 may be a communication interface, a transceiver, a transceiver circuit, and the like. The storage unit 401 may be a memory.

The processing unit 402 is configured to determine, through the communication unit 403, first information corresponding to a reference time unit on a first unlicensed carrier; and determine a first CWS according to the first information, wherein the first CWS is used for performing channel detection on the first unlicensed carrier.

As can be seen in the embodiments of the disclosure, the network device determines the first information corresponding to the reference time unit on the first unlicensed carrier, and determines the first CWS according to the first information, and the first CWS is used for performing channel detection on the first unlicensed carrier. In this way, the network device flexibly determines the first CWS used for channel detection according to different first information on the first unlicensed carrier, which is beneficial to improve the accuracy of determining the first CWS, such that when the first CWS is used for performing channel detection on the first unlicensed carrier, friendly coexistence of multiple systems on the unlicensed spectrum can be realized, and mutual interference of multiple systems on the unlicensed spectrum can be avoided.

In a possible example, the reference time unit includes a part of time units or all time units in a reference time period.

In this possible example, the reference time period is in an associated relationship with a preset parameter group, and the preset parameter group includes any one of following groups: a start position and a first length; an end position and a second length; the start position and the end position.

In this possible example, the start position is a start time point of one downlink burst, or the start position is a start time point of one channel occupancy time initiated by a base station; the first length includes a length of one downlink burst, or the first length includes a length of one channel occupancy time initiated by the base station, or the first length includes a maximum length of one channel occupancy time initiated by the base station; the end position is determined by the network device according to a first offset value, wherein the first offset value is pre-configured or protocol-provided, or the first offset value is determined according to a processing capability of the base station; or, the end position is an end time point of one burst, or the end position is an end time point of one channel occupancy time; the second length is pre-configured or protocol-provided, and the second length includes a length of one channel occupancy time, or the second length includes a maximum length of one channel occupancy time.

In a possible example, the first information includes any one or combination of following types of information: hybrid automatic repeat request-acknowledgement HARQ-ACK information corresponding to a physical downlink shared channel PDSCH transmitted on the reference time unit; HARQ-ACK information on the reference time unit; information of a terminal device transmitting the HARQ-ACK information on the reference time unit; information on whether a transport block TB in physical uplink shared channel PUSCH on the reference time unit is correctly decoded; information on whether a physical random access channel PRACH sequence is detected in PRACH resource on the reference time unit.

In a possible example, the first information includes the HARQ-ACK information, and as to determining the first CWS according to the first information, the processing unit 402 is specifically configured to perform at least one of following operations: if a proportion of negative acknowledgement NACK information in the HARQ-ACK information included in the first information is greater than or equal to a first threshold, determining the first CWS by performing an increase operation on a current second CWS; if the proportion of NACK information in the HARQ-ACK information included in the first information is less than the first threshold, determining the first CWS by performing a decrease operation on the current second CWS or determining the current second CWS as the first CWS.

In this possible example, the first information includes first HARQ-ACK information corresponding to the PDSCH transmitted on the reference time unit, and the proportion of NACK information in the HARQ-ACK information included in the first information is determined based on at least one of following cases: if the first HARQ-ACK information is transmitted through a licensed carrier, the PDSCH corresponding to the first HARQ-ACK information is scheduled through a physical downlink control channel PDCCH on the first unlicensed carrier, and the first HARQ-ACK information is not detected by the network device, then the first HARQ-ACK information is determined as NACK information; if the first HARQ-ACK information is transmitted through a licensed carrier, the PDSCH corresponding to the first HARQ-ACK information is scheduled through a PDCCH on a carrier other than the first unlicensed carrier, and the first HARQ-ACK information is not detected by the network device, then the first HARQ-ACK information is not used for determining the proportion of NACK information; if the first HARQ-ACK information is transmitted through a second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is not used for determining the proportion of NACK information; if the first HARQ-ACK information is transmitted through the second unlicensed carrier, the PDSCH corresponding to the first HARQ-ACK information is scheduled through the PDCCH on the first unlicensed carrier, and the first HARQ-ACK information is not detected by the network device, then the first HARQ-ACK information is determined as NACK information; if the first HARQ-ACK information is transmitted through the second unlicensed carrier, the PDSCH corresponding to the first HARQ-ACK information is scheduled through the PDCCH on a carrier other than the first unlicensed carrier, and the first HARQ-ACK information is not detected by the network device, then the first HARQ-ACK information is not used for determining the proportion of NACK information; if the first HARQ-ACK information is transmitted through a licensed carrier, the PDSCH corresponding to the first HARQ-ACK information is transmitted through a first subband on the first unlicensed carrier, the PDSCH corresponding to the first HARQ-ACK information is scheduled through a PDCCH on a second subband on the first unlicensed carrier, the first CWS is used for performing channel detection on the first subband, and the first HARQ-ACK information is not detected by the network device, then the first HARQ-ACK information is not used for determining the proportion of NACK information; if the first HARQ-ACK information is transmitted through a licensed carrier, the PDSCH corresponding to the first HARQ-ACK information is transmitted through a first subband on the first unlicensed carrier, the PDSCH corresponding to the first HARQ-ACK information is scheduled through a PDCCH on a second subband on the first unlicensed carrier, the first CWS is used for performing channel detection on a third subband, the third subband includes at least the second subband, and the first HARQ-ACK information is not detected by the network device, then the first HARQ-ACK information is determined as NACK information.

In a possible example, the first information includes at least part of second HARQ-ACK information on the reference time unit, and the proportion of NACK information in the HARQ-ACK information included in the first information is determined based on at least one of following cases: if channel detection is not performed before transmission of the second HARQ-ACK information, a PDSCH corresponding to the second HARQ-ACK information is scheduled through a PDCCH on the first unlicensed carrier, and the second HARQ-ACK information is not detected by the network device, then the second HARQ-ACK information is determined as NACK information; if channel detection is not performed before transmission of the second HARQ-ACK information, the PDSCH corresponding to the second HARQ-ACK information is scheduled through a PDCCH on a carrier other than the first unlicensed carrier, and the second HARQ-ACK information is not detected by the network device, then the second HARQ-ACK information is not used for determining the proportion of NACK information; if channel detection is performed before transmission of the second HARQ-ACK information, the PDSCH corresponding to the second HARQ-ACK information is scheduled through the PDCCH on the first unlicensed carrier, and the second HARQ-ACK information is not detected by the network device, then the second HARQ-ACK information is determined as NACK information; if channel detection is performed before transmission of the second HARQ-ACK information, the PDSCH corresponding to the second HARQ-ACK information is scheduled through a PDCCH on a carrier other than the first unlicensed carrier, and the second HARQ-ACK information is not detected by the network device, then the second HARQ-ACK information is determined as NACK information; if channel detection is performed before transmission of the second HARQ-ACK information, the PDSCH corresponding to the second HARQ-ACK information is scheduled through a PDCCH on a carrier other than the first unlicensed carrier, and the second HARQ-ACK information is not detected by the network device, then the second HARQ-ACK information is not used for determining the proportion of NACK information.

In this possible example, the PDSCH corresponding to the at least part of the second HARQ-ACK information is transmitted through the first unlicensed carrier.

In a possible example, the first information includes the information of the terminal device transmitting the HARQ-ACK information on the reference time unit, and as to determining the first CWS according to the first information, the processing unit 402 is specifically configured to perform at least one of following operations: if a proportion of terminal devices with HARQ-ACK information being not detected by the network device on the reference time unit is greater than or equal to a second threshold, determining the first CWS by performing an increase operation on a current second CWS; if the proportion of terminal devices with HARQ-ACK information being not detected by the network device on the reference time unit is less than the second threshold, determining the first CWS by performing a decrease operation on the current second CWS or determining the current second CWS as the first CWS; if the proportion of terminal devices with HARQ-ACK information being detected by the network device on the reference time unit is less than a third threshold, determining the first CWS by performing an increase operation on a current second CWS; if the proportion of terminal devices with HARQ-ACK information being detected by the network device on the reference time unit is greater than or equal to the third threshold, determining the first CWS by performing a decrease operation on the current second CWS or determining the current second CWS as the first CWS.

In a possible example, the first information includes information on whether a TB in at least part of PUSCH on the reference time unit is correctly decoded, and as to determining the first CWS according to the first information, the processing unit 402 is specifically configured to perform at least one of following operations: if a proportion of TBs successfully received by the network on the reference time unit is less than a fourth threshold, determining the first CWS by performing an increase operation on a current second CWS; if the proportion of TBs successfully received by the network device on the reference time unit is greater than or equal to the fourth threshold, determining the first CWS by performing a decrease operation on the current second CWS or determining the current second CWS as the first CWS.

In this possible example, a channel access scheme corresponding to the at least part of PUSCH includes at least one of Category 1 channel detection, Category 2 channel detection, and Category 4 channel detection with a highest channel access priority.

In a possible example, the at least part of PUSCH includes a PUSCH for transmitting Message 3 in a random access procedure, and the proportion of TBs successfully received by the network device on the reference time unit is determined based on at least one of following cases: if the PUSCH on the reference time unit is used for transmitting a first TB, the first TB includes the Message 3, and the first TB is successfully received by the network device, then the first TB is used for determining the proportion of TBs successfully received; if the PUSCH on the reference time unit is used for transmitting the first TB, the first TB includes the Message 3, and the first TB is not successfully received by the network device, then the first TB is not used for determining the proportion of TBs successfully received.

In a possible example, the first information includes information on whether the PRACH sequence is detected in the PRACH resource on the reference time unit, and as to determining the first CWS according to the first information, the processing unit 402 is specifically configured to perform at least one of following operations: if the PRACH sequence is not detected by the network device in the PRACH resource on the reference time unit, determining the first CWS by performing an increase operation on a current second CWS or determining the current second CWS as the first CWS; if at least one PRACH sequence is detected by the network device in the PRACH resource on the reference time unit, determining the first CWS by performing a decrease operation on a current second CWS.

In a possible example, the first information further includes information on whether a common PDSCH on the reference time unit is transmitted, and the common PDSCH includes at least one of: a random access response, a paging message, and a system message.

In this possible example, as to determining the first CWS according to the first information, the processing unit 402 is specifically configured to perform following operations: if the common PDSCH is not transmitted on the reference time unit, determining the first CWS by performing a decrease operation on a current second CWS or determining the current second CWS as the first CWS.

When the processing unit 402 is a processor, the communication unit 403 is a communication interface, and the storage unit 401 is a memory, the network device involved in the embodiments of the disclosure may be the network device shown in FIG. 2A.

Embodiments of the disclosure also provides a computer-readable storage medium, wherein the computer-readable storage medium stores a computer program for electronic data exchange, and the computer program causes a computer to execute part or all of the steps of the network device as described in the above method embodiments.

Embodiments of the disclosure also provides a computer program product, wherein the computer program product includes a non-transitory computer-readable storage medium storing a computer program, and the computer program is operable to cause a computer to execute part or all of the steps of the network device as described in the above method embodiments. The computer program product may be a software installation package.

The steps of the method or algorithm described in the embodiments of the disclosure may be implemented in a hardware manner, or may be implemented in a manner that a processor executes software instructions. The software instructions can be composed of corresponding software modules, which can be stored in random access memory (RAM), flash memory, read only memory (ROM), erasable programmable ROM (EPROM), electrically EPROM (EEPROM), registers, hard disk, mobile hard disk, CD-ROM or any other form of storage medium known in the art. An exemplary storage medium is coupled to the processor, so that the processor can read information from the storage medium and can write information to the storage medium. Alternatively, the storage medium may also be an integral part of the processor. The processor and the storage medium may be located in an ASIC. In addition, the ASIC may be located in an access network device, a target network device, or a core network device. Alternatively, the processor and the storage medium may also exist as discrete components in the access network device, the target network device, or the core network device.

Those skilled in the art should be aware that, in one or more of the foregoing examples, the functions described in the embodiments of the disclosure may be implemented in whole or in part by software, hardware, firmware, or any combination thereof. When implemented by software, it can be implemented in the form of a computer program product in whole or in part. The computer program product includes one or more computer instructions. When the computer program instructions are loaded and executed on the computer, the processes or functions described in the embodiments of the disclosure are generated in whole or in part. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center, to another website, computer, server, or data center in a wired manner (e.g., coaxial cable, optical fiber, digital subscriber line (DSL)) or a wireless manner (e.g., infrared, wireless, microwave, etc.). The computer-readable storage medium may be any available medium that can be accessed by a computer or a data storage device such as a server or a data center integrated with one or more available medium. The available medium may be a magnetic medium (e.g., a floppy disk, a hard disk, a magnetic tape), an optical medium (e.g., a digital video disc (DVD)), a semiconductor medium (e.g., a Solid State Disk (SSD)), or the like.

The above specific implementations further describe the purpose, technical solutions, and beneficial effects of the embodiments of the disclosure in detail. It should be understood that the foregoing are only specific implementations of the embodiments of the disclosure, but are not intended to limit the protection scope of the embodiments of the disclosure. Any modifications, equivalent replacements, improvements made on the basis of the technical solutions of the embodiments of the disclosure shall be included in the protection scope of the embodiments of the disclosure.

What is claimed is:

1. A method for determining a contention window size (CWS), applied to a network device, comprising:
   determining hybrid automatic repeat request-acknowledgement (HARQ-ACK) information corresponding to a physical downlink shared channel (PDSCH) transmitted on a reference time unit on a first unlicensed carrier; and
   determining a first CWS according to the HARQ-ACK information, wherein the first CWS is used for performing channel detection on the first unlicensed carrier,
   wherein the reference time period is a time period between a start position and an end position, the start position is a start time point of one channel occupancy time (COT) initiated by a base station, and the end position is an end time point of one burst.

2. The method according to claim 1, wherein determining the first CWS according to the HARQ-ACK information comprises at least one of:
   in response to that a proportion of negative acknowledgement NACK information in the HARQ-ACK information is greater than or equal to a first threshold, determining the first CWS by performing an increase operation on a current second CWS; or
   in response to that the proportion of NACK information in the HARQ-ACK information is less than the first threshold, determining the first CWS by performing a decrease operation on the current second CWS or determining the current second CWS as the first CWS.

3. The method according to claim 2, wherein the proportion of NACK information in the HARQ-ACK information is determined based on at least one of:
   in response to that the HARQ-ACK information is transmitted through a licensed carrier, the PDSCH corresponding to the HARQ-ACK information is scheduled through a physical downlink control channel (PDCCH) on the first unlicensed carrier, and the HARQ-ACK information is not detected by the network device, then the HARQ-ACK information is determined as NACK information;
   in response to that the HARQ-ACK information is transmitted through a licensed carrier, the PDSCH corresponding to the HARQ-ACK information is scheduled through a PDCCH on a carrier other than the first unlicensed carrier, and the HARQ-ACK information is not detected by the network device, then the HARQ-ACK information is not used for determining the proportion of NACK information;
   in response to that the HARQ-ACK information is transmitted through a second unlicensed carrier, the PDSCH corresponding to the HARQ-ACK information is scheduled through the PDCCH on the first unlicensed carrier, and the HARQ-ACK information is not detected by the network device, then the HARQ-ACK information is not used for determining the proportion of NACK information;
   in response to that the HARQ-ACK information is transmitted through the second unlicensed carrier, the PDSCH corresponding to the HARQ-ACK information is scheduled through the PDCCH on the first unlicensed carrier, and the HARQ-ACK information is not detected by the network device, then the HARQ-ACK information is determined as NACK information;
   in response to that the HARQ-ACK information is transmitted through the second unlicensed carrier, the PDSCH corresponding to the HARQ-ACK information is scheduled through the PDCCH on a carrier other than the first unlicensed carrier, and the HARQ-ACK information is not detected by the network device, then the HARQ-ACK information is not used for determining the proportion of NACK information;
   in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on the first subband, and the HARQ-ACK information is not detected by the network device, then the HARQ-ACK information is not used for determining the proportion of NACK information; or
   in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on a third subband, the third subband comprises at least the second subband, and the HARQ-ACK information is not detected by the network device, then the HARQ-ACK information is determined as NACK information.

4. A network device, comprising a processor and a memory configured to store a computer program executable by the processor, wherein the processor, through calling and running the computer program stored in the memory, is configured to:
   determine hybrid automatic repeat request-acknowledgement (HARQ-ACK) information corresponding to a physical downlink shared channel (PDSCH) transmitted on a reference time unit on a first unlicensed carrier; and
   determine a first CWS according to the HARQ-ACK information, wherein the first CWS is used for performing channel detection on the first unlicensed carrier,
   wherein the reference time period is a time period between a start position and an end position, the start position is a start time point of one channel occupancy time (COT) initiated by a base station, and the end position is an end time point of one burst.

5. The network device according to claim 4, wherein the processor is further configured to perform at least one of:
   in response to that a proportion of negative acknowledgement NACK information in the HARQ-ACK information is greater than or equal to a first threshold, determining the first CWS by performing an increase operation on a current second CWS; or
   in response to that the proportion of NACK information in the HARQ-ACK information is less than the first threshold, determining the first CWS by performing a decrease operation on the current second CWS or determining the current second CWS as the first CWS.

6. The network device according to claim 5, wherein the proportion of NACK information in the HARQ-ACK information is determined based on at least one of:

in response to that the HARQ-ACK information is transmitted through a licensed carrier, the PDSCH corresponding to the HARQ-ACK information is scheduled through a physical downlink control channel (PDCCH) on the first unlicensed carrier, and the HARQ-ACK information is not detected by the network device, then the HARQ-ACK information is determined as NACK information;

in response to that the HARQ-ACK information is transmitted through a licensed carrier, the PDSCH corresponding to the HARQ-ACK information is scheduled through a PDCCH on a carrier other than the first unlicensed carrier, and the HARQ-ACK information is not detected by the network device, then the HARQ-ACK information is not used for determining the proportion of NACK information;

in response to that the HARQ-ACK information is transmitted through a second unlicensed carrier, the PDSCH corresponding to the HARQ-ACK information is scheduled through the PDCCH on the first unlicensed carrier, and the HARQ-ACK information is not detected by the network device, then the HARQ-ACK information is not used for determining the proportion of NACK information;

in response to that the HARQ-ACK information is transmitted through the second unlicensed carrier, the PDSCH corresponding to the HARQ-ACK information is scheduled through the PDCCH on the first unlicensed carrier, and the HARQ-ACK information is not detected by the network device, then the HARQ-ACK information is determined as NACK information;

in response to that the HARQ-ACK information is transmitted through the second unlicensed carrier, the PDSCH corresponding to the HARQ-ACK information is scheduled through the PDCCH on a carrier other than the first unlicensed carrier, and the HARQ-ACK information is not detected by the network device, then the HARQ-ACK information is not used for determining the proportion of NACK information;

in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on the first subband, and the HARQ-ACK information is not detected by the network device, then the HARQ-ACK information is not used for determining the proportion of NACK information; or in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on a third subband, the third subband comprises at least the second subband, and the HARQ-ACK information is not detected by the network device, then the HARQ-ACK information is determined as NACK information.

7. A non-transitory computer-readable storage medium, storing a computer program for electronic data exchange, wherein the computer program causes a computer to execute a method for determining a contention window size (CWS), the method comprising:

determining hybrid automatic repeat request-acknowledgement (HARQ-ACK) information corresponding to a physical downlink shared channel (PDSCH) transmitted on a reference time unit on a first unlicensed carrier; and determining a first CWS according to the HARQ-ACK information, wherein the first CWS is used for performing channel detection on the first unlicensed carrier, wherein the reference time period is a time period between a start position and an end position, the start position is a start time point of one channel occupancy time (COT) initiated by a base station, and the end position is an end time point of one burst.

8. The storage medium according to claim 7, wherein determining the first CWS according to the HARQ-ACK information comprises at least one of:

in response to that a proportion of negative acknowledgement NACK information in the HARQ-ACK information is greater than or equal to a first threshold, determining the first CWS by performing an increase operation on a current second CWS; or in response to that the proportion of NACK information in the HARQ-ACK information is less than the first threshold, determining the first CWS by performing a decrease operation on the current second CWS or determining the current second CWS as the first CWS.

9. The storage medium according to claim 8, wherein the proportion of NACK information in the HARQ-ACK information is determined based on at least one of:

in response to that the HARQ-ACK information is transmitted through a licensed carrier, the PDSCH corresponding to the HARQ-ACK information is scheduled through a physical downlink control channel (PDCCH) on the first unlicensed carrier, and the HARQ-ACK information is not detected by the network device, then the HARQ-ACK information is determined as NACK information;

in response to that the HARQ-ACK information is transmitted through a licensed carrier, the PDSCH corresponding to the HARQ-ACK information is scheduled through a PDCCH on a carrier other than the first unlicensed carrier, and the HARQ-ACK information is not detected by the network device, then the HARQ-ACK information is not used for determining the proportion of NACK information;

in response to that the HARQ-ACK information is transmitted through a second unlicensed carrier, the PDSCH corresponding to the HARQ-ACK information is scheduled through the PDCCH on the first unlicensed carrier, and the HARQ-ACK information is not detected by the network device, then the HARQ-ACK information is not used for determining the proportion of NACK information;

in response to that the HARQ-ACK information is transmitted through the second unlicensed carrier, the PDSCH corresponding to the HARQ-ACK information is scheduled through the PDCCH on the first unlicensed carrier, and the HARQ-ACK information is not detected by the network device, then the HARQ-ACK information is determined as NACK information;

in response to that the HARQ-ACK information is transmitted through the second unlicensed carrier, the PDSCH corresponding to the HARQ-ACK information is scheduled through the PDCCH on a carrier other than the first unlicensed carrier, and the HARQ-ACK information is not detected by the network device, then the HARQ-ACK information is not used for determining the proportion of NACK information;

in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on the first subband, and the HARQ-ACK information is not detected by the network device, then the HARQ-ACK information is not used for determining the proportion of NACK information; or in response to that the HARQ-ACK information is transmitted through a licensed carrier, the PDSCH corresponding to the HARQ-ACK information is transmitted through a first subband on the first unlicensed carrier, the PDSCH corresponding to the HARQ-ACK information is scheduled through a PDCCH on a second subband on the first unlicensed carrier, the first CWS is used for performing channel detection on a third subband, the third subband comprises at least the second subband, and the HARQ-ACK information is not detected by the network device, then the HARQ-ACK information is determined as NACK information.

* * * * *